United States Patent
Cho et al.

(10) Patent No.: US 10,023,479 B2
(45) Date of Patent: Jul. 17, 2018

(54) CAPACITIVE DEIONIZATION APPARATUS AND METHODS OF TREATING A FLUID USING THE SAME

(71) Applicant: Samsung Electronics Co., Ltd., Suwon-Si, Gyeonggi-Do (KR)

(72) Inventors: Myung Dong Cho, Hwaseong-si (KR); Joon Seon Jeong, Seoul (KR); Hyun Seok Kim, Suwon-si (KR); Hyo Rang Kang, Anyang-si (KR); Da Hye Park, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1074 days.

(21) Appl. No.: 14/299,217

(22) Filed: Jun. 9, 2014

(65) Prior Publication Data

US 2014/0367262 A1    Dec. 18, 2014

(30) Foreign Application Priority Data

Jun. 12, 2013 (KR) .......................... 10-2013-0067381

(51) Int. Cl.
*C02F 1/469* (2006.01)
*C02F 1/461* (2006.01)

(52) U.S. Cl.
CPC .. *C02F 1/4691* (2013.01); *C02F 2001/46161* (2013.01)

(58) Field of Classification Search
CPC .................................................. C02F 1/4691
See application file for complete search history.

(56) References Cited

U.S. PATENT DOCUMENTS

| 4,082,694 | A | 4/1978 | Wennerberg et al. |
| 4,285,831 | A | 8/1981 | Yoshida et al. |
| 4,346,067 | A | 8/1982 | Wachter |
| 4,382,599 | A | 5/1983 | Tilbor |
| 5,057,296 | A | 10/1991 | Beck |
| 5,192,432 | A | 3/1993 | Andelman |

(Continued)

FOREIGN PATENT DOCUMENTS

| EP | 01031645 A1 | 8/2000 |
| EP | 2112125 A1 | 10/2009 |

(Continued)

OTHER PUBLICATIONS

Machine Translation of KR 2003-0018635A.*

(Continued)

*Primary Examiner* — Bryan D. Ripa
(74) *Attorney, Agent, or Firm* — Harness, Dickey & Pierce, P.L.C.

(57) ABSTRACT

The present disclosure relates to a spacer structure that is configured to be disposed between a pair of electrodes in a capacitive deionization apparatus so as to provide a space for flowing a fluid therethrough. The spacer structure includes a copolymer prepared by copolymerizing a mixture of a polyurethane backbone including a carboxyl group or a sulfonic acid group, an ion conductive monomer including a carboxyl group and a cation exchange group, and a second polymer including a functional group that reacts with the carboxyl group or sulfonic acid group and forms a cross-linking bond with the polyurethane backbone.

20 Claims, 3 Drawing Sheets

(56) References Cited

U.S. PATENT DOCUMENTS

| | | |
|---|---|---|
| 5,415,768 A | 5/1995 | Andelman |
| 5,447,636 A | 9/1995 | Banerjee |
| 5,482,599 A | 1/1996 | Watanabe |
| 5,626,977 A | 5/1997 | Mayer et al. |
| 6,051,205 A | 4/2000 | Yamamoto et al. |
| 6,359,019 B1 | 3/2002 | Stone et al. |
| 6,383,980 B1 | 5/2002 | Hagihara et al. |
| 6,580,598 B2 * | 6/2003 | Shiue ............ B82Y 30/00 361/502 |
| 6,709,560 B2 * | 3/2004 | Andelman ............ C02F 1/008 204/630 |
| 6,835,688 B2 | 12/2004 | Morikawa et al. |
| 7,582,684 B2 | 9/2009 | Rasmussen et al. |
| 7,641,819 B2 | 1/2010 | Dejesus et al. |
| 7,727,675 B2 | 6/2010 | Cho et al. |
| 7,816,052 B2 | 10/2010 | Cho et al. |
| 8,158,196 B2 | 4/2012 | Moya |
| 2002/0167782 A1 | 11/2002 | Andelman et al. |
| 2003/0173222 A1 | 9/2003 | Srinivasan et al. |
| 2004/0012913 A1 | 1/2004 | Andelman |
| 2005/0036270 A1 | 2/2005 | Faris et al. |
| 2007/0051684 A1 | 3/2007 | Grebenyuk et al. |
| 2007/0248760 A1 | 10/2007 | Chmelka et al. |
| 2010/0096269 A1 | 4/2010 | Kaku et al. |
| 2010/0238606 A1 | 9/2010 | Dreissig et al. |
| 2011/0147212 A1 | 6/2011 | Kim et al. |
| 2012/0093908 A1 | 4/2012 | Kim et al. |
| 2012/0178619 A1 | 7/2012 | Ji et al. |
| 2012/0178834 A1 | 7/2012 | Linder et al. |
| 2012/0228215 A1 | 9/2012 | Yang et al. |
| 2013/0075260 A1 | 3/2013 | Reinhoudt et al. |
| 2013/0129592 A1 | 5/2013 | Kim et al. |
| 2013/0178356 A1 | 7/2013 | Kim et al. |
| 2013/0264209 A1 * | 10/2013 | Kwon ................ C02F 1/4695 204/638 |
| 2014/0144779 A1 * | 5/2014 | Jeong ................ C02F 1/4691 204/536 |
| 2014/0346046 A1 * | 11/2014 | Andelman ............ C02F 1/4691 204/554 |
| 2016/0236952 A1 * | 8/2016 | Ikeda .................... B01D 61/42 |

FOREIGN PATENT DOCUMENTS

| | | | |
|---|---|---|---|
| KR | 20030018635 A | * | 3/2003 |
| KR | 20030070398 A | | 8/2003 |
| KR | 20050072089 A | | 7/2005 |
| KR | 20090036596 A | | 4/2009 |
| KR | 20090094161 A | | 9/2009 |
| KR | 101029090 B1 | | 4/2011 |
| KR | 20110071701 A | | 6/2011 |
| KR | 20120040593 A | | 4/2012 |
| KR | 20120081845 A | | 7/2012 |
| KR | 20120101789 A | | 9/2012 |
| KR | 20130056649 A | | 5/2013 |
| KR | 10-2013-0081012 A | | 7/2013 |
| KR | 20130072761 A | | 7/2013 |
| KR | 10-2013-0113817 A | | 10/2013 |
| WO | WO-01017680 A1 | | 3/2001 |
| WO | WO-01/90443 A1 | | 11/2001 |

OTHER PUBLICATIONS

Extended European Search Report dated Mar. 13, 2014, issued in corresponding European Application No. 13192838.4-1351.

Li et al., Ion-exchange membrane capacitive deionization: A new strategy for brackish water desalination, Desalination 275, 2011, pp. 62-66, Elsevier B.V.

OREN, Capacitive deionization (CDI) for desalination and water treatment-past, present and future (a review), ScienceDirect, Desalination 228, 2008, pp. 10-29, Elsevier B.V.

* cited by examiner

CAPACITIVE DEIONIZATION APPARATUS AND METHODS OF TREATING A FLUID USING THE SAME

CROSS-REFERENCE TO RELATED APPLICATION

This application claims priority under 35 U.S.C. § 119 to Korean Patent Application No. 10-2013-0067381, filed in the Korean Intellectual Property Office on Jun. 12, 2013, the entire contents of which are incorporated herein by reference.

BACKGROUND

1. Field

The present disclosure relates to a capacitive deionization apparatus and methods of treating a fluid using the same.

2. Description of the Related Art

In some regions, domestic water may include a relatively large amount of minerals. In Europe or other regions, limestone substances frequently flow in underground water, and thus tap water in these regions contains a relatively large amount of minerals. Water having a high mineral content (i.e., hard water) may cause problems in terms of the formation of lime scales in the interior walls of pipes and a sharp decrease in energy efficiency when it is used for home installations, for example, a heat exchanger or a boiler. In addition, hard water is inappropriate for use as wash water. Therefore, there has been some demand for technology for removing ions from hard water to make it into soft water, in particular, in an environmentally-friendly manner. Furthermore, demands for seawater desalination have increased as larger areas are suffering from water shortages.

A capacitive deionization (CDI) apparatus is a device for applying a voltage to porous electrodes having nano-sized pores to make them carry a polarity and thereby adsorb ionic materials from a medium such as hard water onto the surface of the electrodes and thus remove the same therefrom. In the CDI apparatus, when a medium containing dissolved ions flows between two electrodes of a positive electrode and a negative electrode and DC power having a low potential difference is applied thereto, the anionic components and the cationic components among the dissolved ions are adsorbed and concentrated onto the positive electrode and the negative electrode, respectively. When an electric current flows in a reverse direction between the two electrodes by, for example, short-circuiting the two electrodes, the concentrated ions are detached from the electrodes. Since the CDI apparatus does not require a high potential difference, its energy efficiency is high, harmful ions may be removed together with the hard components when the ions are adsorbed, and its recycling process does not need any chemicals.

SUMMARY

Some example embodiments of the present disclosure relate to a capacitive deionization apparatus having improved deionization efficiency.

Some example embodiments of the present disclosure relate to a spacer structure for the capacitive deionization apparatus.

Some example embodiments of the present disclosure relate to a method of removing ions from a fluid using the capacitive deionization apparatus.

According to one example embodiment of the present disclosure, a capacitive deionization apparatus includes at least one pair of porous electrodes and a spacer structure interposed between the pair of electrodes and for forming a path for flowing a fluid therebetween and preventing an electrical short circuit, wherein the spacer structure includes a copolymer prepared by copolymerizing a mixture of a polyurethane backbone including a carboxyl group or a sulfonic acid group and an ion conductive monomer including a carboxyl group and a cation exchange group, with a second polymer including a functional group that reacts with the carboxyl group or sulfonic acid group and forms a cross-linking bond with the polyurethane backbone.

The polyurethane backbone including a carboxyl group or a sulfonic acid group may be polyurethane including a repeating unit represented by the following Chemical Formula 1.

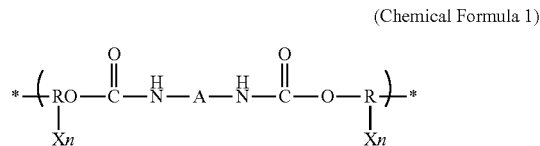

(Chemical Formula 1)

In the above Chemical Formula 1,

A and R are independently a substituted or unsubstituted C6 to C30 aromatic organic group, a substituted or unsubstituted divalent to hexavalent C1 to C20 aliphatic organic group, or a substituted or unsubstituted divalent to hexavalent C3 to C30 alicyclic organic group, X is $COOH$ or $SO_3H$, and n is an integer ranging from 1 to 10.

Specifically, the A and R of the above Chemical Formula 1 may be independently selected from the following chemical formulae:

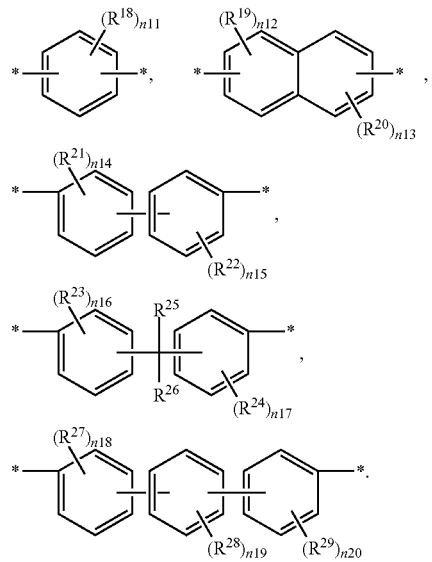

In the above chemical formulae, $R^{18}$ to $R^{29}$ are the same or different and are independently a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

The A and R of the above Chemical Formula 1 may independently be a substituted or unsubstituted C1 to C20 alkylene, or a substituted or unsubstituted C3 to C30 cycloalkylene.

The ion conductive monomer including a carboxyl group and a cation exchange group may be a monomer including a carboxyl group and a sulfonic acid group, a monomer including a carboxyl group and a hydroxy group, or a monomer including a carboxyl group and another ion exchange group.

The monomer including the carboxyl group and the sulfonic acid group may be a sodium salt of sulfonic acid. Specifically, the sodium salt of sulfonic acid may be a sulfoisophthalic acid sodium salt, a sulfosuccinic acid sodium salt, a sulfosalicylic acid sodium salt, and the like, but is not limited thereto.

Specifically, the monomer including a carboxyl group and a sulfonic acid group may be a sulfoisophthalic acid sodium salt represented by the following Chemical Formula 2.

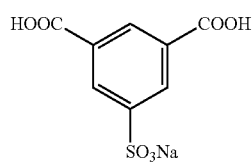

(Chemical Formula 2)

The second polymer including a functional group that reacts with the carboxyl group or the sulfonic acid group of polyurethane and an ion conductive monomer and forms a cross-linking bond may be a polymer including an oxazole group, or a polymer including a phenyl alcohol in the side chain.

Specifically, the second polymer including a functional group that reacts with the carboxyl group or the sulfonic acid group of polyurethane and an ion conductive monomer and forms a cross-linking bond may be polyoxazoline.

The capacitive deionization apparatus may further include a charge barrier that is a cation permselective membrane or an anion permselective membrane disposed between the electrode and the spacer structure, and includes a material different from that of the electrode material.

In the capacitive deionization apparatus, the porous electrodes may include a conductive agent and an ion conductive binder, and the binder may be a polymer including a cation exchange group selected from a sulfonic acid group ($-SO_3H$), a carboxyl group ($-COOH$), a phosphonic acid group ($-PO_3H_2$), a phosphinic acid group ($-HPO_3H$), and a nitrous acid group ($-NO_2H$), in the main chain or the side chain of the polymer, or a polymer having an anion exchange group selected from a quaternary ammonium salt ($-NH_3$), a primary amine group ($-NH_2$), a secondary amine group ($-NHR$), a tertiary amine group ($-NR_2$), a quaternary phosphonium group ($-PR_4$), and a tertiary sulfonium group ($-SR_3$), in the main chain or the side chain of the polymer.

Specifically, the polymer for the binder may be selected from polystyrene, polyvinyl alcohol, carboxylmethyl cellulose, hydroxypropyl cellulose, polyvinyl chloride, carboxylated polyvinylchloride, polyvinyl fluoride, polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, and an epoxy resin, and polyacrylamide.

The electrode material may include at least one porous conductive material selected from activated carbon, an aerogel, carbon nanotubes (CNT), mesoporous carbon, an activated carbon fiber, graphite oxide, and a metal oxide.

The spacer structure may have an open mesh, non-woven fabric, woven fabric, or foam shape.

The spacer structure including the copolymer may have ion conductivity of greater than or equal to about 10 μS/cm in 20 ppm NaCl solution at ambient temperature.

The spacer structure including the copolymer may have a thickness of about 50 μm to about 500 μm, and an open area of about 20% to about 90%.

The spacer structure including the copolymer may have equivalent series resistance (ESR) of about 1 to about 300 ohms as measured under the condition of about 20 mg/L NaCl.

The spacer structure including the copolymer may have an ion exchange capacity of about 0.01 meq/g to about 10 meq/g.

In another example embodiment of the present disclosure, a spacer structure disposed between one pair of electrodes in a capacitive deionization apparatus to provide a space for flowing a fluid is provided. The spacer structure includes a copolymer prepared by copolymerizing a mixture of a polyurethane backbone including a carboxyl group or a sulfonic acid group and an ion conductive monomer including a carboxyl group and a cation exchange group, with a second polymer including a functional group that reacts with the carboxyl group or sulfonic acid group and forms a cross-linking bond with the polyurethane backbone.

Other structures of the spacer structure may be the same as the capacitive deionization apparatus described above.

In yet another example embodiment of the present disclosure, a method of treating a fluid may include (a) providing a capacitive deionization apparatus including at least a pair of porous electrodes and a spacer structure disposed between the pair of electrodes to provide a path for flowing a fluid and including an electrically-insulating material; and (b) supplying a fluid including ions through the path for flowing the fluid into the capacitive deionization apparatus and applying a voltage between the pair of electrodes to adsorb the ions onto the electrodes and remove them from the fluid, wherein the spacer structure includes a copolymer prepared by copolymerizing a mixture of a polyurethane backbone including a carboxyl group or a sulfonic acid group and an ion conductive monomer including a carboxyl group and a cation exchange group, with a second polymer including a functional group that reacts with the carboxyl group or sulfonic acid group and forms a cross-linking bond with the polyurethane backbone.

The method of treating a fluid may further include short-circuiting the pair of electrodes or applying a reverse-direction voltage between the pair of electrodes to detach the adsorbed ions.

DETAILED DESCRIPTION

Figure 1:
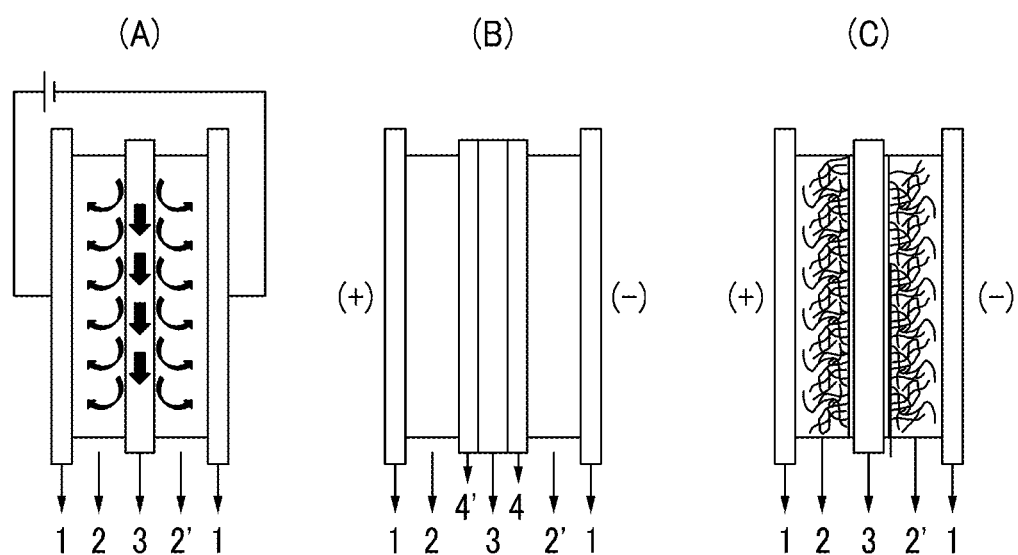
FIG. 1 is a schematic view showing examples of a capacitive deionization apparatus according to a non-limiting embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, when specific definition is not otherwise provided, the term "substituted" may refer to one substituted with at least one substituent selected from a halogen (F, Br, Cl, or I), a hydroxy group, a nitro group, a cyano group, an amino group ($NH_2$, $NH(R^{100})$, or $N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, instead of at least one hydrogen of a functional group.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 aryl group or a C6 to C30 arylene group, and specifically a C6 to C16 aryl group or a C6 to C16 arylene group, the term "hetero cyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group that include 1 to 3 heteroatoms selected from O, S, N, P, Si, and a combination thereof in one ring, and specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group that include 1 to 3 heteroatoms selected from O, S, N, P, Si, and a combination thereof in one ring.

As used herein, when specific definition is not otherwise provided, the term "combination" refers to a mixture or copolymerization. The term "copolymerization" refers to block copolymerization to random copolymerization, and the term "copolymer" refers to a block copolymer to a random copolymer.

In addition, in the specification, the mark "*" may refer to where something is connected with the same or different atom or chemical formula.

As used herein, the term "capacitive deionization apparatus" refers to a device that may separate/concentrate ions by passing fluids to be separated or to be concentrated including at least one ion component through a flow path formed between at least one pair of porous electrodes and applying a voltage thereto so as to adsorb the ion components on the pores in the electrodes. The capacitive deionization apparatus may have any geometric structure.

As used herein, the term "porous electrode" refers to a conductive structure including an electrically-conductive material and having a high specific surface area due to the presence of pores therein having a diameter of nanometers or larger, for example, about 0.5 nm to about 5 μm.

As used herein, "ion exchangeable polymer" may refer to a polymer including an ion exchangeable group in the main chain or the side chain of the polymer.

The capacitive deionization apparatus according to one example embodiment includes at least one pair of porous electrodes including an electrode material having a surface area for electrostatic adsorption of feed ions, and a spacer structure disposed between the pair of electrodes to provide a path for flowing a fluid therebetween and including an electrically-insulating material, wherein the spacer structure includes an ion exchange group on the surface thereof.

The porous electrode may be a positive electrode or a negative electrode. The porous electrode may be a negative electrode having a cation exchange group or a positive electrode having an anion exchange group. The thickness of the electrode is not particularly limited, and may be appropriately selected. For example, the electrode may have a thickness of about 50 μm to about 500 μm, and specifically, about 100 μm to 300 μm.

The porous electrode may be combined with a current collector. When including multiple pairs of electrodes, both sides of the current collector may be combined with the electrodes, respectively. The current collector is electrically connected to a power source, thereby applying a voltage to the electrodes. The current collector may include a graphite plate or a graphite foil, or at least one metal selected from Cu, Al, Ni, Fe, Co, and Ti, or a metal mixture or alloy thereof.

The electrode material may include a porous electrically-conductive material having electrical double layer capacitance, which may be used singularly or in a combination. Non-limiting examples of the porous electrically-conductive material may include at least one selected from activated carbon, an aerogel, carbon nanotubes (CNT), mesoporous carbon, activated carbon fiber, graphite oxide, and a metal oxide. The porous electrically-conductive material may have a shape of a fiber, a particle, or may be in any shape. The porous electrically-conductive material may have a specific surface area of about 500 to about 1500 m$^2$/g, and specifically about 700 to about 1200 m$^2$/g.

The porous electrode may further include a conductive agent for enhancing the electrical conductivity of the electrode. Types of the conductive agent are not particularly limited, and it is possible to use any materials that are generally used for manufacturing electrodes. Non-limiting examples of the conductive agent may be selected from carbon materials such as carbon black, VGCF (vapor growth carbon fiber), natural graphite, artificial graphite, acetylene black, ketjen black, a carbon fiber and the like; metal materials such as a metal powder or a metal fiber of copper, nickel, aluminum, silver, and the like; conductive polymers such as a polyphenylene derivative; or a mixture thereof.

The porous electrode may further include a binder for binding the porous electrically-conductive materials to each other to provide a continuous structure and for easily attaching each electrode to a current collector. Types of binder are not particularly limited, and may include any binder typically used for the preparation of electrodes. Non-limiting examples of the binder may include polystyrene, polyvinyl alcohol, carboxylmethyl cellulose, hydroxypropyl cellulose, polyvinyl chloride, carboxylated polyvinyl chloride, polyvinyl fluoride, polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, polyacrylamide, and a mixture thereof.

Alternatively, the porous electrode includes a binder having a cation exchange group, and may be used as a negative electrode having a cation exchange group. As a further alternative, the porous electrode includes a binder having an anion exchange group, and may be used as a positive electrode having an anion exchange group. Non-limiting examples of the binder having an anion exchange group or a cation exchange group may be a polymer having a cation exchange group selected from a sulfonic acid group (—SO$_3$H), a carboxyl group (—COOH), a phosphonic acid group (—PO$_3$H$_2$), a phosphinic acid group (—HPO$_3$H), and a nitrous acid group (—NO$_2$H), in the main chain or the side chain of a generally-used polymer for a binder, or a polymer having an anion exchange group selected from a quaternary ammonium salt (—NH$_3$), a primary, secondary, or tertiary amine group (—NH$_2$, —NHR, —NR$_2$), a quaternary phosphonium group (—PR$_4$), and a tertiary sulfonium group (—SR$_3$), in the main chain or the side chain of a generally-used polymer for a binder. Such polymers may be prepared by any appropriate methods, or are commercially available.

A cation that may be exchanged by the cation exchange group may be an alkali metal or alkaline-earth metal ion, for example, Li+, Na+, K+, Ca+, and the like, and an anion that may be exchanged by the anion exchange group may be —NH$_3$, —NH$_2$, —NHR, —NR$_2$, —PR$_4$, —SR$_3$, and the like.

The spacer structure disposed between the pair of electrodes forms a path for flowing a fluid (i.e., a flow channel) between the electrodes, prevents a short circuit between the electrodes, has relatively high mechanical strength due to the copolymer prepared by copolymerizing a mixture of a polyurethane backbone including a carboxyl group or a sulfonic acid group, and an ion conductive monomer including a carboxyl group and a cation exchange group, and a second polymer including a functional group that reacts with the carboxyl group or sulfonic acid group and forms a cross-linking bond with the polyurethane backbone, and improves ion mobility in a fluid because ion diffusion of divalent cations, for example $Ca^{2+}$, $Mg^{2+}$, and the like, becomes faster due to ion conductivity of the monomer.

As aforementioned, the spacer structure includes a copolymer including a polyurethane backbone, and thus shows higher mechanical strength compared with a spacer structure manufactured in a form of a membrane or a mesh by using a conventional PVA (polyvinyl alcohol), PEEK (polyether ether sulfone), or a PSS-Na (polystyrene sulfonic acid sodium salts) polymer. In addition, since the polyurethane as a backbone is copolymerized with an ion conductive monomer simultaneously including a cation exchange group and a carboxyl group capable of cross-linking with the second polymer, the copolymer has ion conductivity. The copolymer including a monomer having ion conductivity may decrease solution resistance of a fluid containing ions in a low amount, and thus may improve ion removal efficiency of a CDI apparatus including the spacer.

The polyurethane may be prepared by reacting isocyanate and polyol. Accordingly, the polyurethane backbone including the carboxyl group or sulfonic acid group may be prepared by using a compound having an isocyanate group or polyol one of which is substituted with a carboxyl group or a sulfonic acid group. For example, isocyanate represented by the following Chemical Formula 3 is reacted with a diol including a carboxyl group or a sulfonic acid group represented by the following Chemical Formula 4 to prepare a polyurethane backbone represented by the following Chemical Formula 1.

  (Chemical Formula 3)

In the above Chemical Formula 3, A is a substituted or unsubstituted C6 to C30 aromatic organic group, a substituted or unsubstituted divalent to hexavalent C1 to C20 aliphatic organic group, or a substituted or unsubstituted divalent to hexavalent C3 to C30 alicyclic organic group.

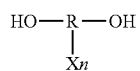  (Chemical Formula 4)

In the above Chemical Formula 4, R is a substituted or unsubstituted C1 to C20 aliphatic organic group, a substituted or unsubstituted C3 to C30 alicyclic organic group, or a substituted or unsubstituted C6 to C30 aromatic organic group, X is —COOH or —$SO_3H$, and n is an integer ranging from 1 to 10.

(Chemical Formula 1)

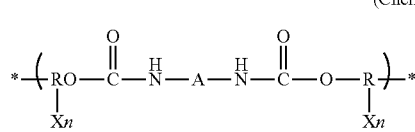

In the above Chemical Formula 1, A, R, X, and n are the same as in the above Chemical Formulae 4 and 5.

Examples of the A and R may be represented by the following chemical formulae:

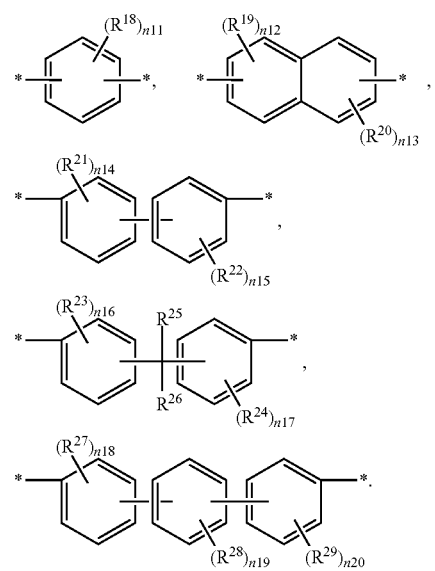

In the above chemical formulae, $R^{18}$ to $R^{29}$ are the same or different and are independently a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

The A and R of the above Chemical Formula 1 may independently be a substituted or unsubstituted C1 to C20 alkylene, or a substituted or unsubstituted C3 to C30 cycloalkylene.

The isocyanate of the above Chemical Formula 3 may be water dispersive isocyanate, for example TDI (toluene diisocyanate), MDI (diphenylmethane diisocyanate), and the like, but is not limited thereto.

The diols of the above Chemical Formula 4 may be carboxylated ethylene glycol, carboxylated propylene glycol, carboxylated diethylene glycol, and the like. HMBA (4-hydroxy-3-(hydroxymethyl)-2-methylbutanoic acid) having a carboxyl group and two —OH groups may be used. HMBA has a structure represented by the following Chemical Formula 5:

(Chemical Formula 5)

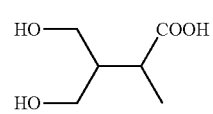

The ion conductive monomer including a carboxyl group and a cation exchange group may be a monomer including a carboxyl group and a sulfonic acid group, a monomer including a carboxyl group and a hydroxy group, or a monomer including a carboxyl group and another ion exchangeable group.

Specifically, the monomer including the carboxyl group and sulfonic acid group may be a sodium salt of sulfonic acid. The sodium salt of sulfonic acid may be a sulfoisophthalic acid sodium salt (SiPacid), a sulfosuccinic acid sodium salt, a sulfosalicylic acid sodium salt, and the like, but is not limited thereto.

The sulfoisophthalic acid sodium salt (SiPacid) has a structure of the following Chemical Formula 2:

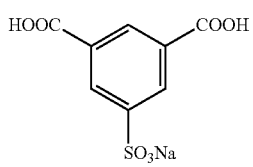

(Chemical Formula 2)

The monomer including the carboxyl group and hydroxy group may be HMBA represented by the above Chemical Formula 5, but is not limited thereto.

The monomer including a carboxyl group and other ion exchangeable group may be a sodium salt of a carboxyl group and nitric acid, a sodium salt of a carboxyl group and phosphoric acid, a lithium salt of a carboxyl group and sulfonic acid, a lithium salt of a carboxyl group and nitric acid, or a lithium salt of a carboxyl group and phosphoric acid, but is not limited thereto.

Each carboxyl group of the SiPacid of the above Chemical Formula 2 and the HMBA of the above Chemical Formula 5 may form a cross-linking bond with a functional group of the second polymer.

The second polymer including a functional group that reacts with the carboxyl group or the sulfonic acid group of polyurethane and ion conductive monomer and forms a cross-linking bond may be a polymer substituted or unsubstituted with an oxazole group in the side chain, or a polymer substituted or unsubstituted with a phenyl alcohol group in the side chain.

Specifically, the second polymer may be polyoxazoline, or an aziridine or epoxy-based copolymer substituted with an oxazole group or a phenyl alcohol group in the side chain.

For example, copolymerization of a mixture of polyurethane including a carboxyl group and the ion conductive monomer represented by the above Chemical Formula 2, and polyoxazoline as the second polymer including an oxazole group, is shown in the following Reaction Scheme 1:

(Reaction Scheme 1)

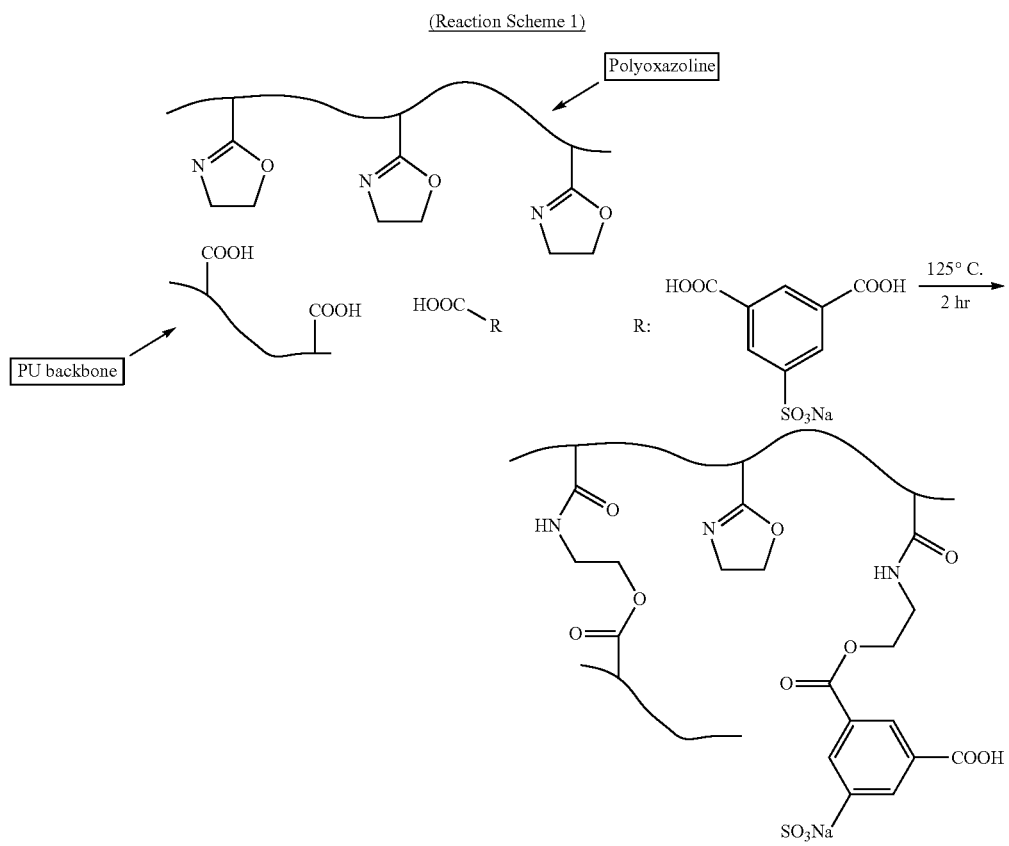

As shown in Reaction Scheme 1, the second polymer (polyoxazoline) including an oxazole group is cross-linked with the polyurethane including a carboxyl group and the ion conductive monomer including a carboxyl group and forms a copolymer having a mechanically strong and rigid structure, and accordingly, since the polymer and ion conductive monomer are prevented from being dissolved in an aqueous solution, the copolymer has more stability in the long term. In addition, the copolymer has ion conductivity due to the ion conductive monomer, and thus may increase an ion removal rate of a capacitive deionization apparatus having the spacer structure including the copolymer.

For example, the spacer structure including the copolymer may have ion conductivity of greater than or equal to about 10 μS/cm.

The spacer structure may be formed with any material that is capable of providing a flow channel for a fluid and preventing the electrode from being short-circuited, and may have any shapes. For a non-limiting example, the spacer structure may have an open mesh, non-woven fabric, woven fabric, or foam shape.

The thickness of the spacer structure is not particularly limited, but it may range from about 50 μm to about 500 μm, and specifically from about 100 μm to about 300 μm, in light of the flow amount and the solution resistance. The open area of the spacer structure may range from about 20% to about 80%, and specifically from about 30% to about 50%, in light of the flow amount and the solution resistance.

The spacer structure may play a role of lowering the solution resistance of fluid flowing therethrough.

The ions in the fluid (e.g., water) may be removed by using a capacitive deionization apparatus at high efficiency when the concentration of ions to be removed is within a predetermined level (e.g., less than or equal to about 2000 ppm). However, when the ion concentration of the feed solution is relatively low, for example, 500 ppm or lower, such a low level of the ion concentration of water passing between the pair of electrodes results in a higher level of solution resistance applied in the flow channel. Thereby, a higher degree of voltage drop may occur in the flow channel. As a result, the driving voltage that may be used as a real driving force for the ion adsorption from the voltage applied to the pair of electrodes is sharply decreased, and this leads to lower efficiency for the adsorption. Thereby, it may be difficult to obtain a treated solution having high purity of about 60 μS/cm or less by using the capacitive deionization apparatus. In the capacitive deionization apparatus according to one example embodiment, the spacer structure that may prevent the short circuit and serve as a flow path between the electrodes includes the cross-linked copolymer of the ion conductive monomer, so the solution resistance in the flow path may be maintained at a low level even when the feed solution having a relatively low ion concentration passes therethrough. In addition, it is possible to decrease the degree of the voltage drop in the flow path. Accordingly, the overall deionization efficiency may become higher, and it is possible to produce a treated solution having high purity (e.g., having an ion concentration of less than or equal to about 15 ppm), and the device may be operated at a high flow rate.

The spacer structure may have an equivalent series resistance of about 0.1 ohms to about 500 ohms, and specifically about 1 to about 300 ohms, as measured under the conditions of 20 mg/L NaCl when its thickness is about 200 μm and area is 100 cm$^2$. In addition, the ion exchange capacity of the spacer structure including the ion exchange group on the surface may range from about 0.01 meq/g to about 10 meq/g, and specifically, from about 0.1 meq/g to about 5 meq/g.

The capacitive deionization apparatus according to one example embodiment may further include a charge barrier disposed between the spacer structure and the porous electrode. The charge barrier may be a cation permselective membrane or an anion permselective membrane. The cation or anion permselective membrane may be prepared by an appropriate method, or is commercially available. Examples of cation or anion permselective membranes, which may be used in the capacitive deionization apparatus, may include, but are not limited to, Neosepta CMX, Neosepta AMX, or the like manufactured by Tokuyama.

The capacitive deionization apparatus may have any geometric structure. By way of non-limiting examples, the capacitive deionization apparatus may have a schematic structure as shown in FIG. 1 (A) to (C). Hereinafter, the capacitive deionization apparatus will be explained with reference to the drawings.

Referring to FIG. 1 (A), porous electrodes 2 and 2' are coated on a current collector 1, and a spacer structure 3 is inserted between the electrodes 2 and 2' to provide a flow path. In the capacitive deionization apparatus shown in FIG. 1 (B), porous electrodes 2 and 2' are coated on a current collector 1; a spacer structure 3 is inserted between the electrodes 2 and 2' to provide a flow path; and a cation permselective membrane 4 or 4' and an anion permselective membrane 4' or 4 are inserted between the electrode and the spacer structure. In addition, in the case of apparatus shown in FIG. 1 (C), electrodes 2 and 2' are coated on a current collector 1; and a spacer structure 3 is inserted between the electrodes 2 and 2' to define a flow path, wherein the electrode 2 is a positive electrode (or a negative electrode) using an anion (or cation) exchange binder, and the electrode 2' is a negative electrode (or a positive electrode) using a cation (or anion) exchange binder.

In the apparatus shown in FIG. 1 (A) to (C), when the voltage is applied between the electrodes while a feed solution passes through the flow path defined by the spacer structure, the electrostatic force causes the ions in the feed solution to be adsorbed onto the electrode and thereby to be removed from the feed solution. Accordingly, the electrical resistance is higher at the outlet of the treated solution than at the inlet of the feed solution. For example, when the feed solution is a NaCl solution having a concentration of 100 ppm, the conductivity of the feed solution corresponds to about 200 μS/cm, and the resistivity is about 5000 Ωcm. Meanwhile, if the treated solution discharged from the apparatus has about 70% of ions removed and has conductivity of 60 μS/cm, the treated solution of the outlet has resistivity of about 16666.7 Ωcm. When the treated solution includes a lower amount of ions, it brings about a higher electrical resistance at the outlet.

Meanwhile, water may be decomposed at a potential of about 1.2 V or higher. Therefore, the capacitive deionization apparatus may not be operated at a potential of several volts or higher even when such a level of potential is desirable for enhancing the efficiency of the ion removal. In the capacitive deionization apparatus according to one example embodiment, the spacer structure includes the cross-linked copolymer of the ion conductive monomer, and therefore, a lower level of the solution resistance may occur in the flow path and thus a lower level of the voltage is required for driving the apparatus. Further, the ion removal capacity of the apparatus may increase in comparison with an apparatus having an equivalent volume, and particularly, the solution resistance may be maintained at a relatively low level even when water having a low ion content flows the flow channel, and thereby it is possible to provide a treated solution having higher purity.

A spacer structure according to another example embodiment of the present disclosure is disposed between a pair of electrodes in the capacitive deionization apparatus to provide a space for flowing a fluid, and has equivalent series resistance (ESR) ranges from about 1 to about 300 ohms as measured under the condition of about 20 mg/L NaCl by including the above-described cross-linked copolymer. The details of the spacer structure are the same as described in the capacitive deionization apparatus.

Yet another example embodiment of the present disclosure relates to a method of treating a fluid that includes (a) providing a capacitive deionization apparatus including at least a pair of porous electrodes and a spacer structure disposed between the pair of electrodes to provide a path for flowing a fluid and including an electrically-insulating material; and (b) supplying a fluid including ions through the path for flowing the fluid into the capacitive deionization apparatus and applying a voltage between the pair of electrodes to adsorb the ions onto the electrode and remove them from the fluid, wherein the spacer structure includes a copolymer prepared by copolymerizing a mixture of a polyurethane backbone including a carboxyl group or a sulfonic acid group and an ion conductive monomer including a carboxyl group and a cation exchange group, with a second polymer including a functional group that reacts with the carboxyl group or sulfonic acid group and forms a cross-linking bond with the polyurethane backbone.

The method of treating a fluid may further include (c) short-circuiting the pair of electrodes or applying a reverse-direction voltage between the pair of electrodes to detach the adsorbed ions.

The details of the capacitive deionization apparatus may be the same as described above.

The fluid including the ions, supplied into the capacitive deionization apparatus, is not particularly limited, but, for example, it may be sea water, or it may be hard water containing calcium ions or magnesium ions. According to the method of treating a fluid, the solution resistance occurring in the flow path may be maintained at a low level even if the fluid includes ions at a relatively low concentration, so that the treated solution may have high purity. The rate of supplying the fluid is not particularly limited, but may be adjusted as required. For example, the rate may range from about 5 to about 50 ml/minute.

When a DC voltage is applied to the electrode while supplying the fluid, the ions present in the fluid are adsorbed onto the surface of the electrode. The applied voltage may be appropriately selected in light of the cell resistance, the concentration of the solution, or the like, and for example, it may be about 2.5 V or lower, and specifically, may range from about 1.0 V to about 2.0 V. When applying the voltage, the ion removal efficiency, as calculated from the measurement of the ion conductivity of the fluid, may be about 50% or higher, specifically, about 75% or higher, and more specifically, about 90% or higher.

The aforementioned capacitive deionization apparatus and the aforementioned methods may find their utility in most home appliances using water, for example, a washing machine, a refrigerator, a water softener, or the like, and may also be used in an industrial water treatment device such as for seawater desalination and ultrapure water manufacture.

Hereinafter, various embodiments are illustrated in more detail with reference to the following examples. However, it should be understood that the scope of the present disclosure is not limited to these examples.

EXAMPLES

Examples 1 to 10: Preparation of Polyurethane (PU) Ion Conductive Membrane

A cross-linked copolymer having a number average molecular weight of greater than or equal to about 300,000 is synthesized by mixing IPDI (isophorone diisocyanate) and PTMEG (poly tetramethylene ether glycol) in a mole ratio of 2:1, adding 15 wt % of polyoxazoline based on the weight of the PTMEG thereto, adding sulfoisophthalic acid sodium salts thereto as the weight ratio is changed as provided in the following Table 1, and agitating the resulting mixture for greater than or equal to about 1 hour.

The copolymer solution is formed into an about 100 µm-thick membrane by adding distilled water thereto, casting the mixture to be 500 µm thick on a glass plate with a doctor's blade after setting spinning viscosity at 1000 to 2000 cP, drying the coated glass plate at room temperature for about 1 hour, and then heating the dried glass plate at 120° C. for 2 hours.

The polyurethane ion conductive membrane is cut to a size of about 1 cm², and ion conductivity of the polyurethane ion conductive membrane is measured. The results are provided in the following Table 1.

TABLE 1

| Examples | 1 | 2 | 3 | 4 | 5 | 6 | 7 | 8 | 9 | 10 |
|---|---|---|---|---|---|---|---|---|---|---|
| 20 wt % polyurethane aqueous solution (g) | 5 | 5 | 5 | 5 | 5 | 5 | 5 | 5 | 3 | 1 |
| 20 wt % SiPacid aqueous solution (g) | 5 | 6 | 7 | 8 | 9 | 10 | 11 | 12 | 15 | 18 |
| NMP (g) | 5 | — | — | — | — | — | — | — | — | — |
| 15 wt % oxazoline aqueous solution (g) | 0.3 | 0.3 | 0.3 | 0.3 | 0.3 | 0.3 | 0.3 | 0.3 | 0.5 | 0.5 |
| Ion conductivity (µS/cm) | 133 | 120 | 113 | 115 | 153 | 203 | 181 | 161 | 220 | 283 |

Examples 11 to 20: Preparation of Ion Conductive Spacer Coated with Ion Exchange Polymer Ion conductive spacers coated with an ion conductive polymer are manufactured by respectively dip-coating the polyurethane (PU) cross-linked copolymer solutions according to Examples 1 to 10 on the surface of PA (polyaramid) meshes used in conventional capacitive deionization apparatuses (CDI), primarily drying the coated meshes at room temperature, and drying and cross-linking them at 120° C. after putting them on a glass or TEFLON (tetrafluoroethylene) sheet.

Comparative Example

A PSS-Na (polystyrene sulfonic acid sodium salt) polymer (Aldrich-Sigma Co., Ltd.) used in a conventional capacitive deionization apparatus (CDI) is formed into a membrane in the same way as Examples 1 to 10, and also is coated on the surface of PA mesh in the same way as Examples 11 to 20 to prepare spacer. The PSS-Na membrane and spacer coated therewith are compared with the polyurethane (PU) cross-linked copolymers prepared according to Examples 1 to 10 and the spacers prepared in Examples 11 to 20 under the same conditions and states.

The evaluation is performed to examine an ion conductivity change between a conventional PSS-Na polymer and the polyurethane cross-linked copolymer (PU-SiPacid) according to the present exemplary embodiment.

Results

The oxazoline-cross-linked polyurethane ionic polymers synthesized according to Examples 1 to 10 have higher mechanical strength, and particularly, insolubility in water compared with a conventionally widely-used polystyrene sulfonic acid sodium salt (PSS-Na) polymer. Accordingly, the polymers may be applied as a spacer in a CDI apparatus, and may secure a long cycle characteristic of the apparatus.

Figure 2:
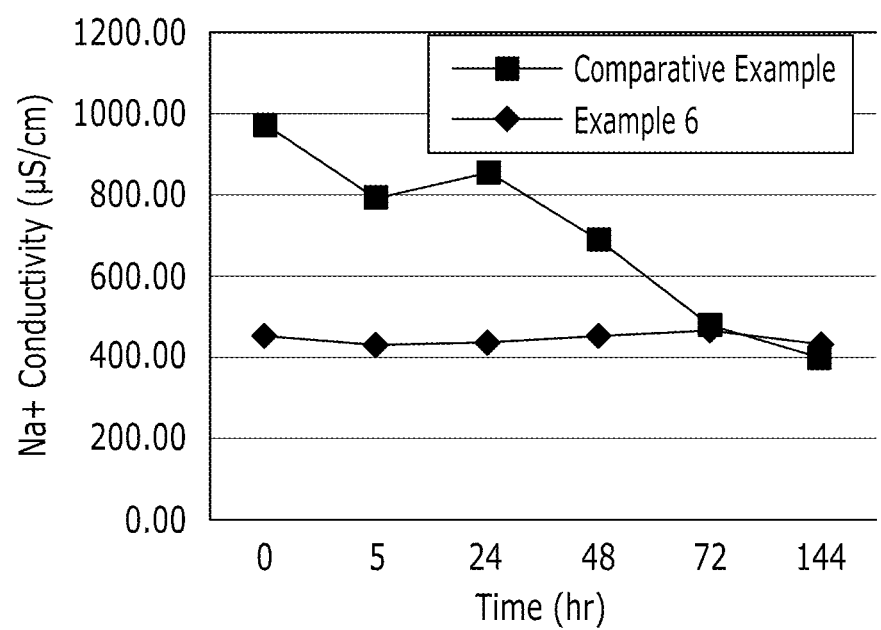
FIG. 2 is a graph showing changes in conductivity versus time for a membrane including the polyurethane copolymer prepared according to an example embodiment of the present disclosure, and a conventional PSS-Na membrane.

FIG. 2 shows results found by respectively coating a polyurethane cross-linking bond ionic polymer (PU-SiPacid) according to Example 6 and a polystyrene sulfonic acid sodium salt (PSS-Na) polymer according to the comparative example on a PA (polyaramid) mesh for CDI to manufacture a spacer and dipping each spacer in a 20 ppm NaCl aqueous solution for one hour, and then measuring ion conductivity of the spacers depending on time. As shown in FIG. 2, the spacer coated with the PU-SiPacid polymer according to Example 6 has no higher Na+ ion conductivity than that of a conventional PSS-Na polymer-coated mesh initially, but has no ion conductivity decrease as time passes. On the other hand, the conventional PSS-Na polymer-coated spacer has high Na+ ion conductivity initially, but has sharply decreased ion conductivity as time passes.

Figure 3:
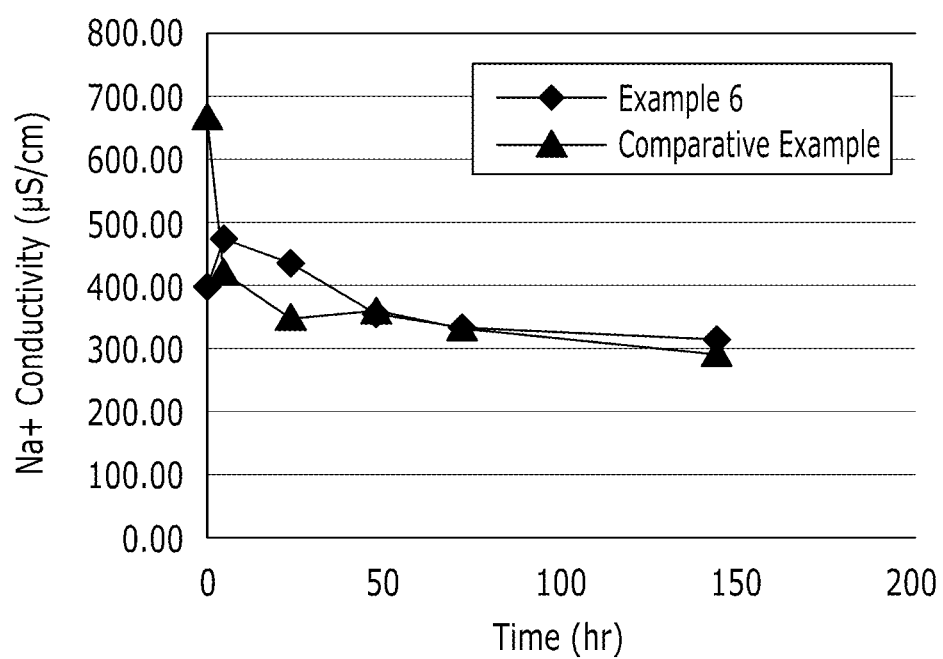
FIG. 3 is a graph showing changes in conductivity versus time for a CDI spacer (mesh) coated with the polyurethane copolymer prepared according to an example embodiment of the present disclosure, and a conventional PSS-Na membrane.

When the synthesized oxazoline cross-linking polyurethane ionic polymer (PU-SiPacid) and the conventional polystyrene sulfonic acid sodium salt (PSS-Na) are coated on a spacer mesh for CDI and measured regarding ion conductivity over the long term, the spacer using PU-SiPacid according to one example embodiment of the present disclosure maintains ion conductivity longer than the spacer using the conventional polymer as shown in FIG. 3.

The reason is that the conventional PSS-Na polymer has extremely high hydrophilicity and is partially dissolved in water when applied in the water for a long time. However, the PU-SiPacid copolymer according to the present disclosure does not have the same dissolution problem as the PSS-Na polymer of which the ion conductivity decreases as time passes.

While various examples are discussed herein, it should be understood that the present disclosure is not limited to these embodiments. Rather, the present disclosure is intended to cover various modifications and equivalent arrangements included within the spirit and scope of the appended claims.

What is claimed is:

1. A capacitive deionization apparatus, comprising:
    a pair of porous electrodes; and
    a spacer structure between the pair of porous electrodes, the spacer structure defining a path for flowing a fluid therethrough and configured to prevent an electrical short circuit between the pair of porous electrodes, the spacer structure including a copolymer of a first polymer, an ion conductive monomer, and a second polymer, the first polymer having a polyurethane backbone including a first carboxyl group or a sulfonic acid group, the ion conductive monomer including a second carboxyl group and a cation exchange group, the second polymer being cross-linked to the first polymer and the ion conductive monomer.

2. The capacitive deionization apparatus of claim 1, wherein the first polymer is polyurethane including a repeating unit represented by the following Chemical Formula 1:

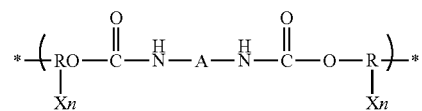

(Chemical Formula 1)

wherein, in the above Chemical Formula 1,
A and R are independently a substituted or unsubstituted C1 to C20 aliphatic organic group, a substituted or unsubstituted C3 to C30 alicyclic organic group, or a substituted or unsubstituted C6 to C30 aromatic organic group,
X is —COOH or —SO$_3$H, and
n is an integer ranging from 1 to 10.

3. The capacitive deionization apparatus of claim 2, wherein the A and R of the above Chemical Formula 1 are independently selected from the following chemical formulae:

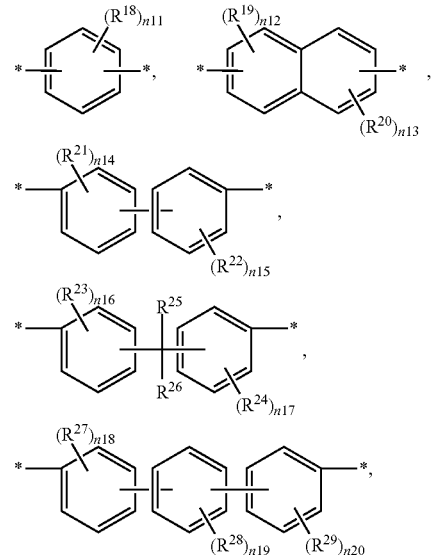

wherein, in the above chemical formulae,
R$^{18}$ to R$^{29}$ are the same or different and are independently a halogen, a substituted or unsubstituted C1 to C10 aliphatic organic group, or a substituted or unsubstituted C6 to C20 aromatic organic group,
n11 and n14 to n20 are independently integers ranging from 0 to 4, and
n12 and n13 are independently integers ranging from 0 to 3.

4. The capacitive deionization apparatus of claim 2, wherein the A and R of the above Chemical Formula 1 are independently a substituted or unsubstituted C1 to C20 alkylene, or a substituted or unsubstituted C3 to C30 cycloalkylene.

5. The capacitive deionization apparatus of claim 1, wherein the cation exchange group of the ion conductive monomer is a sulfonic acid group or a hydroxy group.

6. The capacitive deionization apparatus of claim 5, wherein the cation exchange group of the ion conductive monomer is the sulfonic acid group, the ion conductive monomer being at least one of a sulfoisophthalic acid sodium salt, a sulfosuccinic acid sodium salt, and a sulfosalicylic acid sodium salt.

7. The capacitive deionization apparatus of claim 5, wherein the cation exchange group of the ion conductive monomer is the sulfonic acid group, the ion conductive monomer being a compound represented by the following Chemical Formula 2:

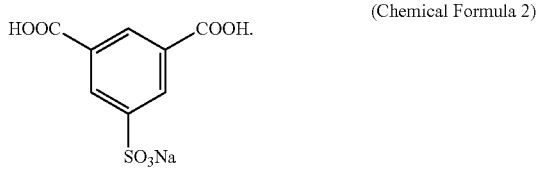

(Chemical Formula 2)

8. The capacitive deionization apparatus of claim 1, wherein the second polymer includes an oxazole group or a phenyl alcohol in a side chain thereof.

9. The capacitive deionization apparatus of claim 1, wherein the second polymer is polyoxazoline.

10. The capacitive deionization apparatus of claim 1, further comprising:
a charge barrier between at least one of the pair of porous electrodes and the spacer structure, the charge barrier being a cation permselective membrane or an anion permselective membrane, the charge barrier including a different material from that of an electrode material of the pair of porous electrodes.

11. The capacitive deionization apparatus of claim 1, wherein the pair of porous electrodes further comprises a conductive agent and a binder, the binder being a third polymer including a cation exchange group or an anion exchange group in a main chain or a side chain thereof, the cation exchange group of the third polymer selected from a sulfonic acid group (—$SO_3H$), a carboxyl group (—COOH), a phosphonic acid group (—$PO_3H_2$), a phosphinic acid group (—$HPO_3H$), and a nitrous acid group (—$NO_2H$), the anion exchange group of the third polymer selected from a quaternary ammonium salt (—$NH_3$), a primary amine group (—$NH_2$), a secondary amine group (—NHR), a tertiary amine group (—$NR_2$), a quaternary phosphonium group (—$PR_4$), and a tertiary sulfonium group (—$SR_3$).

12. The capacitive deionization apparatus of claim 11, wherein the third polymer is selected from polystyrene, polyvinyl alcohol, carboxylmethyl cellulose, hydroxypropyl cellulose, polyvinyl chloride, carboxylated polyvinyl chloride, polyvinyl fluoride, polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and polyacrylamide.

13. The capacitive deionization apparatus of claim 1, wherein the pair of porous electrodes includes an electrode material, the electrode material including at least one porous conductive material selected from activated carbon, an aerogel, carbon nanotubes (CNT), mesoporous carbon, an activated carbon fiber, graphite oxide, and a metal oxide.

14. The capacitive deionization apparatus of claim 1, wherein the spacer structure has an open mesh, non-woven fabric, woven fabric, or foam shape.

15. The capacitive deionization apparatus of claim 1, wherein the spacer structure has ion conductivity of greater than or equal to about 10 μS/cm.

16. The capacitive deionization apparatus of claim 1, wherein the spacer structure has a thickness of about 50 μm to about 500 μm, and an open area of about 20% to about 80%.

17. The capacitive deionization apparatus of claim 1, wherein the spacer structure has equivalent series resistance (ESR) of about 1 to about 300 ohms as measured under a condition of about 20 mg/L NaCl.

18. The capacitive deionization apparatus of claim 1, wherein the spacer structure has an ion exchange capacity of about 0.01 meq/g to about 10 meq/g.

19. A spacer structure configured to be disposed between a pair of porous electrodes in a capacitive deionization apparatus to define a path for flowing a fluid therethrough, the spacer structure comprising:
a copolymer of a first polymer, an ion conductive monomer, and a second polymer, the first polymer having a polyurethane backbone including a first carboxyl group or a sulfonic acid group, the ion conductive monomer including a second carboxyl group and a cation exchange group, the second polymer being cross-linked to the first polymer and the ion conductive monomer.

20. A method of treating a fluid, comprising:
supplying the fluid through a capacitive deionization apparatus, the fluid including ions, the capacitive deionization apparatus including a pair of porous electrodes and a spacer structure between the pair of porous electrodes, the spacer structure defining a path for flowing the fluid therethrough, the spacer structure including an electrically-insulating material, the spacer structure including a copolymer of a first polymer, an ion conductive monomer, and a second polymer, the first polymer having a polyurethane backbone including a first carboxyl group or a sulfonic acid group, the ion conductive monomer including a second carboxyl group and a cation exchange group, the second polymer being cross-linked to the first polymer and the ion conductive monomer; and
applying a voltage between the pair of porous electrodes to adsorb the ions onto the pair of porous electrodes so as to remove the ions from the fluid.

* * * * *